United States Patent
Volmer et al.

(10) Patent No.: US 9,917,450 B2
(45) Date of Patent: Mar. 13, 2018

(54) ELECTRONIC CIRCUIT OF A BATTERY, BATTERY, BLOWER FILTER DEVICE AS WELL AS A METHOD FOR CHARGING A BATTERY OF A BLOWER FILTER DEVICE

(71) Applicant: DRÄGER SAFETY AG & CO. KGAA, Lübeck (DE)

(72) Inventors: Achim Volmer, Lübeck (DE); Andreas Sürig, Krummesse (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 133 days.

(21) Appl. No.: 14/902,197

(22) PCT Filed: Jun. 27, 2014

(86) PCT No.: PCT/EP2014/001762
§ 371 (c)(1),
(2) Date: Dec. 30, 2015

(87) PCT Pub. No.: WO2015/000568
PCT Pub. Date: Jan. 8, 2015

(65) Prior Publication Data
US 2016/0372944 A1     Dec. 22, 2016

(30) Foreign Application Priority Data

Jul. 5, 2013   (DE) .................. 10 2013 011 251

(51) Int. Cl.
*H02J 7/00*      (2006.01)
*H02H 9/00*    (2006.01)
(Continued)

(52) U.S. Cl.
CPC ........... *H02J 7/0029* (2013.01); *H01M 10/46* (2013.01); *H02H 9/008* (2013.01); *H02H 9/025* (2013.01);
(Continued)

(58) Field of Classification Search
CPC ................... H02J 7/0029; H02J 2007/0039
(Continued)

(56) References Cited

U.S. PATENT DOCUMENTS 6,075,345 A * 6/2000 Lee .................. H02J 7/0068
                                                            320/138
6,864,669 B1    3/2005 Bucur
(Continued)

FOREIGN PATENT DOCUMENTS

CN         1638230 A      7/2005
CN         1665061 A      9/2005
(Continued)

*Primary Examiner* — Nathaniel Pelton
(74) *Attorney, Agent, or Firm* — McGlew and Tuttle, P.C.

(57) ABSTRACT

An electronic circuit (1) for charging a battery (15) of a blower filter device (20), which blower filter device (20) can be supplied with power from an external electric power source. The electronic circuit charging terminals for connection to poles of the battery via electric lines. A measuring device measures a charging current. A control unit receives a measured signal of the measuring device and monitors a flow of current through the lines and switches the circuit component to high resistance or opens the circuit in the absence of a charging current. A battery (15) of a blower filter device (20) is also provided as well as a blower filter device (20) for a blower filter system (30) as well as a method for charging a battery (15) of a blower filter device (20).

20 Claims, 3 Drawing Sheets

FIG 2

(51) Int. Cl.
*H01M 10/46* (2006.01)
*H02H 9/02* (2006.01)
*A62B 18/00* (2006.01)

(52) U.S. Cl.
CPC ..... *A62B 18/006* (2013.01); *H02J 2007/0039* (2013.01)

(58) Field of Classification Search
USPC ........................................... 320/107
See application file for complete search history.

(56) References Cited

U.S. PATENT DOCUMENTS

| | | | |
|---|---|---|---|
| 7,298,113 | B2 | 11/2007 | Orikasa |
| 7,699,053 | B1* | 4/2010 | Johnson ............ A62B 7/10 128/200.24 |
| 7,737,658 | B2 | 6/2010 | Sennami et al. |
| 2009/0220825 | A1* | 9/2009 | Nakashima ......... H01M 10/441 429/7 |
| 2009/0303647 | A1 | 12/2009 | Bauer et al. |
| 2010/0215994 | A1* | 8/2010 | Kim .................... H01M 10/46 429/7 |
| 2013/0162201 | A1 | 6/2013 | Yeh |

FOREIGN PATENT DOCUMENTS

| | | |
|---|---|---|
| CN | 101322295 A | 12/2008 |
| CN | 101814725 A | 8/2010 |
| CN | 102 231 516 A | 11/2011 |
| DE | 28 08 963 A1 | 9/1979 |
| DE | 699 12 348 T2 | 7/2004 |
| DE | 10 2005 059571 A1 | 6/2007 |
| DE | 10 2007 023 879 A1 | 12/2008 |
| EP | 0 954 081 A2 | 11/1999 |
| EP | 1 868 274 A1 | 12/2007 |
| GB | 2 478 759 A | 9/2011 |
| TW | 431044 B | 4/2001 |

* cited by examiner

ELECTRONIC CIRCUIT OF A BATTERY, BATTERY, BLOWER FILTER DEVICE AS WELL AS A METHOD FOR CHARGING A BATTERY OF A BLOWER FILTER DEVICE

CROSS REFERENCE TO RELATED APPLICATIONS

This application is a United States National Phase Application of International Application PCT/EP2014/001762 filed Jun. 27, 2014 and claims the benefit of priority under 35 U.S.C. § 119 of German Patent Application 10 2013 011 251.6 filed Jul. 5, 2013 the entire contents of which are incorporated herein by reference.

FIELD OF THE INVENTION

The present invention pertains to an electronic circuit for charging a battery of a blower filter device, which can be supplied with power from an external electric power source. The present invention pertains, furthermore, to a battery of a blower filter device, to a blower filter device with a battery as well as a method for charging a battery of a blower filter device.

BACKGROUND OF THE INVENTION

Blower filter systems are used for light and medium respirators and support the user of respirator filters by reducing the breathing resistance, contrary to conventional gas masks, thus making long fatigue-free use possible. A blower filter system comprises the following main components: A blower filter device, usually worn on the belt, and a head piece, which is designed as a hood or mask. These two components are usually connected to one another via a connection tube. The contaminated air is drawn through a filter by means of the blower filter device, as a result of which it is freed from harmful substances. The purified air is subsequently sent to the head piece and fed to the user of the respirator.

The blower filter device has, among other things, a blower unit with a fan impeller driven by a motor and with a (spiral) housing. The power for the blower unit is usually supplied by a battery. In addition, the blower filter device has a central control unit, which controls the motor of the blower unit and can process inputs of the user. A housing encloses, in general, the blower unit, the control unit and the battery. At least one filter can be connected to the housing.

Blower filter systems are used under greatly different ambient conditions. This may also comprise situations with potentially explosive gases or dusts, which impose special requirements on the components used. Two causes of a potential ignition must be ruled out in case of explosion protection: On the one hand, spark ignition, usually prevented by limiting the energy being released in case of a defect, and, on the other hand, a temperature limitation, which rules out self-ignition.

If a jack is provided at the battery or the blower filter device for charging the battery, this jack must be isolated to avoid spark or glow discharges. This is usually brought about by the use of diodes connected in series, which are designed as single or double redundant diodes, depending on the margin of error needed. One to three diodes, through which the charging current flows, are thus obtained at the charging terminal.

Short charging times are advantageous for users of blower filter devices to achieve the best possible utilization of a blower filter system. It is necessary for this to apply correspondingly high charging currents. Blower filter devices often have batteries or battery packs comprising one or more cells with an energy content of 50 Wh to 70 Wh. Assuming a usual voltage of 14.4 V, this corresponds to approx. 3.5 Ah to 5 Ah. If charging shall be completed in one hour, a current of 3.5 A to 5 A, on average, must be applied over one hour.

The drawback arising from the prior-art solutions with 1-3 diodes connected in series in the charging circuit is the power loss generated in the diodes during charging. This equals between 2.5 W and 7.5 W in the above-mentioned scenario. These large quantities of heat may lead to damage to the battery or the battery pack and cannot therefore be implemented.

DE 10 2005 059 571 A1 discloses an electric circuit, which makes it possible to charge a battery inductively in a small appliance, such as a toothbrush. The circuit contains a charging circuit for charging a battery, which has a charging coil for generating an alternating current and a rectifier diode, wherein the battery is connected in series with the rectifier diode and the charging coil. However, it is difficult to charge batteries for blower filter devices inductively because of the low efficiency of power transmission.

SUMMARY OF THE INVENTION

An object of the present invention is to at least partially eliminate the above-described drawbacks in connection with the charging of a battery or of a battery pack for a blower filter device. In particular, it is the object of the present invention to make available an electronic circuit for charging a battery or a battery pack, a battery or a battery pack with an electronic circuit for charging a blower filter device having a battery and electronic circuit for charging as well as a method for charging a battery of a blower filter device, which make possible a rapid and damage-free charging of the battery or battery pack of the blower filter device.

The above object is accomplished by an electronic circuit according to the invention, by a battery having features according to the invention, by a blower filter device having features according to the invention, as well as by a method for charging a battery of a blower filter device, which method has features according to the invention. Features and details that are described in connection with the electronic circuit according to the present invention also apply, of course, in connection with the battery according to the present invention, the blower filter device according to the present invention and the method according to the present invention and vice versa in each respective case, so that reference is and can always mutually be made to the individual aspects of the invention concerning the disclosure.

According to a first aspect of the present invention, the object is accomplished by an electronic circuit for charging a battery of a blower filter device, which battery can be supplied with power from an external electric power source. The electronic circuit is characterized in that it has a first charging terminal, which can be connected to a positive pole of the battery via a first electric line, and a second charging terminal, which can be connected to a negative pole of the battery via a second electric line. Further, the electric circuit is characterized in that at least one parallel circuit comprising a resistor element, especially a diode or an electric resistor having a resistance of at least 1 kOhm and a circuit component is arranged in the first line or in the second line; that the electric circuit comprises a measuring device, which is designed to measure a charging current through one of the lines or a voltage between the charging terminals; and that at least one electronic control unit, which is designed to monitor the flow of current through the lines, is provided between the circuit component and the measuring device. The measured signal of the measuring device, i.e., the measured signal for the charging current or the voltage, can be received for this by the electronic control unit. Furthermore, the control unit is configured such that it switches the circuit component to high resistance or opens the circuit of said circuit component in the absence of a charging current, and the electronic control unit is configured such that it switches the circuit component to low resistance or closes the circuit of said circuit component in the presence of a charging current, i.e., the circuit component is switched when a charging voltage is present on the charging terminals and an associated charging current is present such that the charging current is switched completely through. This means that the charging current flows through the electric lines, the circuit component, which is switched to low resistance or whose circuit is closed, and the battery, as a result of which the power loss on the circuit component becomes negligible.

The circuit component may be arranged in the so-called (+) line, i.e., the first line, or in the so-called (−) line, i.e., the second line. The measuring device is preferably arranged in the line in which the circuit component is not arranged. However, it is also conceivable in an alternative embodiment of the circuit that the measuring device is arranged in the same line as the circuit component. If two or more circuit components are provided connected in series with one another, an electronic control unit each may be provided between each circuit component and the measuring device. Each circuit component can be actuated by an electronic control unit of its own as a result.

Rapid and damage-free charging of a battery of a blower filter device can be made possible in a cost-effective and simple manner by an electronic circuit having such a design.

The electronic circuit may be connected to the battery, especially to the positive pole and the negative pole of the battery. The electronic circuit is preferably part of the battery, i.e., it is permanently connected to same. A first electric line of the electronic circuit is connected to the positive pole of the battery and thus represents an extension of the positive pole of the battery via the first charging terminal. A second electric line of the electronic circuit is connected to the negative pole of the battery and thus represents an extension of the negative pole of the battery via the second charging terminal.

Depending on the margin of error needed, at least one parallel circuit comprising a resistor element, especially a diode or an electric resistor having a resistance of at least 1 kOhm, and a circuit component, which are each connected via an electronic control unit to a measuring device in the first or second electric line, are arranged in the first or second electric line. The open contacts of the battery are isolated via the at least one circuit component in order to interrupt the flow of current when no external electric power source is connected to the charging terminals of the electric lines and the battery is not being charged. When the battery is being charged, i.e., when an external electric power source is connected to the charging terminals of the electric lines of the electronic circuit, the contacts of the battery are switched to low resistance by at least one parallel circuit, which is actuated by the electronic control unit, and the at least one parallel circuit does not practically generate any power loss.

The criterion for switching on the parallel circuits or the circuit components is preferably not the voltage difference over the circuit components but the current direction. Thus, the circuit components are switched on as soon as the current flowing over the circuit component begins to flow for charging the battery pack.

This solution for the electronic circuit offers the advantage that if the battery contacts (negative pole and positive pole) are used at the same time for charging and discharging, a current limitation can be implemented in a simple manner by the same electronic unit, i.e., the at least one parallel circuit comprising a resistor element and a circuit component, and the current analysis can be implemented in a simple manner by the at least one electronic control unit. The at least one parallel circuit and the at least one circuit component generate a very rapid excess-current protection characteristic.

If an external electric power source, i.e., a charger, is connected to the charging terminals of the electronic circuit, the charging current flows over the resistor element, which is designed especially as a diode, especially as an intrinsic diode, or as an electric resistor, in the first moment. This results in a voltage drop across the measuring device, which is analyzed by the at least one electronic control unit. The measuring device is preferably an electric resistor with low ohmic resistance, which is used to measure the electric current. The current, which is flowing through the measuring device, causes a voltage drop proportional to it, which is measured. The charging of the battery is detected by the electronic circuit in case of a voltage drop across the measuring device and the circuit component is switched through. From this point on, only a minimal power loss is generated on the at least one parallel circuit or the at least one circuit component. A power loss of less than approx. 250 mW, which does not cause damage to the battery, can thus be reached on the parallel circuit or the circuit component, whereas power losses between 2.5 W and 7.5 W were reached in the electronic circuits according to the above-described state of the art. The parallel circuit and the circuit component produce markedly less heat due to this reduction of the power loss on the parallel circuit and on the circuit component, so that the battery cannot be damaged. In particular, a battery can be charged with a markedly higher charging current and hence over a desired, shorter charging time with the use of such an electronic circuit, because the power loss on the at least one parallel circuit and the at least one circuit component can be kept lower.

Especially preferred is an electronic circuit in which the resistor element is designed as a diode, said diode being set up such that at least part of the corresponding charging current flows through the diode in the conducting direction during the charging of the battery.

Especially preferred is, furthermore, an electronic circuit in which the parallel circuit is present as a plurality of parallel circuits, in which two or more parallel circuits, which are connected in series and which have the same design, are provided. If the parallel circuits have the same design, the margin can be kept low.

According to an especially preferred variant of the present invention, provisions may be made in an electronic circuit for the circuit component of a parallel circuit to be a Metal-Oxide Semiconductor Field-Effect Transistor (MOSFET). A MOSFET has the property of being able to switch and block the current in one direction only. A MOSFET is always in the blocked state when no positive voltage is present between the gate terminal and the source terminal of the MOSFET. This means that if no charger is connected to the charging terminals of the electronic circuit, the MOSFET blocks and switches the charging terminals to high resistance and isolates them. If a charger is connected, the current flows over the intrinsic diode of the MOSFET in the first moment. This means that the at least one MOSFET is switched on as soon as the current flowing over the intrinsic diode of the MOSFET begins to flow for charging the battery pack.

An electronic circuit of such a design offers the advantage that if the battery contacts are used at the same time for charging and discharging, a current limitation can be implemented in a simple manner by the same electronic unit, i.e., the MOSFET, and the current analysis can be implemented in a simple manner by the electronic control unit. The at least one MOSFET can additionally implement a very rapid excess-current protection characteristic.

If an external electric power source, i.e., a charger, is connected to the charging terminals of the electronic circuit, the charging current flows over the at least one MOSFET in the first moment. This results in a voltage drop across the measuring device, which is analyzed by the electronic control units. The charging of the battery is detected in case of a voltage drop and the MOSFET is switched through. From this point on, only a minimal power loss is generated on the MOSFET. MOSFETs reach turn-on resistances and a minimal volume resistance of a few mOhms. If assuming, for example, 10 mOhms for such a value, a power loss of only 250 mW is obtained for a charging current of 5 A, and this power loss does not cause any damage to the battery of the blower filter device.

Since the intrinsic diodes of the MOSFET have a voltage drop on the same order of magnitude as conventional solutions, a high power loss may be generated in case of failure of the electronic control units. To prevent the cells of the battery from exploding in case of error due to the introduction of an excessively large amount of energy, the MOSFET is preferably protected by an additional thermally coupled temperature fuse, which opens the circuit in case an excessive amount of heat is generated. Therefore, an electronic circuit in which a thermally coupled temperature fuse is connected in the first or second line, especially between two circuit components, is, furthermore, preferred.

According to a second aspect of the present invention, the object is accomplished by a battery of a blower filter device having an electronic circuit for charging the battery, which can be supplied with power from an external electric power source. The battery is characterized in that the electronic circuit is configured according to the first aspect of the present invention, especially according to the invention. A battery according to the present invention of a blower filter device thus brings with it the same advantages that were explained in detail in reference to an electronic circuit according to the present invention for charging a battery of a blower filter device. A battery that has an electronic circuit according to the present invention can be charged by an external electric power source rapidly and without being damaged in a cost-effective and simple manner. In particular, it is ensured in such a battery that the battery will not be damaged during the charging operation because of the low power loss of the at least one parallel circuit and the at least one circuit component, especially the at least one MOSFET.

A battery in which the electronic circuit is arranged in the blower filter device is preferred. This means that the charging cable is connected to the blower filter device rather than directly to the battery.

Especially preferred is a battery that has a battery pack with a plurality of batteries connected in series to one another. A battery with an electronic circuit according to the present invention can be charged rapidly and reliably, without the battery pack being damaged. In particular, the battery pack can be charged with a relatively high charging current.

Furthermore, a battery that has a protective circuit is preferred. The protective circuit offers protection against overvoltage, excess current, temperature rise and insufficient temperature, deep discharge and inequality of the state of charge of the cells connected in series and may represent a measure for ensuring equality (balancing).

According to a third aspect of the present invention, the object is accomplished by a blower filter device for a blower filter system, having a battery for supplying the blower filter device with electric power, wherein the battery is preferably designed according to the second aspect of the present invention. A blower filter device according to the present invention of a blower filter system that entails the same advantages as those explained in detail in reference to an electronic circuit according to the present invention for charging a battery of a blower filter device and to a battery of a blower filter device.

According to a fourth aspect of the present invention, the object is accomplished by a method for charging a battery of a blower filter device by means of an electronic circuit according to the first aspect of the present invention, especially according to one of the claims 1 through 4, said method being characterized by the following method steps:

a) When an absence of a charging current is determined, the circuit component is switched to high resistance or its circuit is opened, and b) when the presence of a charging current is determined, the circuit component is switched to low resistance or its circuit is closed.

As long as no external electric power source is connected to the charging terminals, the electric lines are blocked by the at least one circuit component, because the circuit component is switched to high resistance or its circuit is opened and is thus isolated. If an external electric power source is connected to the first charging terminal and the second charging terminal, so that a charging current is flowing through the at least one circuit component, the voltage drop is measured by the measuring device and if a voltage drop is determined at the measuring device, the circuit component is switched by the electronic control unit such that the charging current is switched fully through for charging the battery and is flowing through the electric lines, the circuit component, which is switched to low resistance or whose circuit is closed, and the battery.

The method according to the present invention for charging a battery of a blower filter device therefore entails the same advantages as those explained in detail with reference to an electronic circuit according to the present invention for charging a battery of a blower filter device and to a battery of a blower filter device.

The electronic circuit isolates the charging contacts of the battery to the outside when no external electric power source is connected. After an external electric power source is connected to the charging terminals of the electronic circuit, the circuit components and hence the charging contacts of the battery are switched to low resistance and thus they do not practically generate a power loss. The circuit component, especially the MOSFET, is switched on when the current direction necessary for charging is detected. This means that the semiconductor components are switched on as soon as the current flowing over the parallel circuit, especially the intrinsic diode, begins to flow for charging the battery. The method offers the advantage that if the battery contacts are used at the same time for charging and discharging, a current limitation can be implemented by the at least one parallel circuit and the at least one circuit component, especially the MOSFET, and the current analysis can be implemented by the electronic control unit. The at least one circuit component can additionally implement a very rapid excess-current protection characteristic.

The above invention will be explained in more detail on the basis of the drawing figures attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
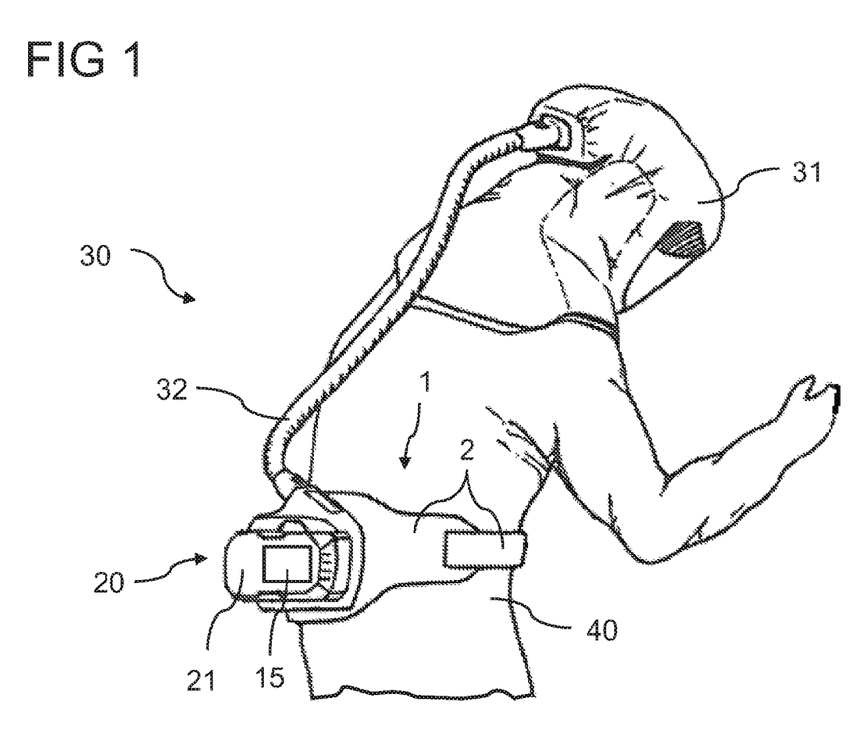
FIG. 1 is a view showing a blower filter system having a blower filter device with a battery, a head piece as well as a connection tube.

FIG. 1 schematically shows a blower filter system 30 having a blower filter device 20, a head piece 31 as well as a connection tube 32, which connects the blower filter device 20 and the head piece 31 to one another in fluid-communicating manner. The blower filter device 20 is arranged on a carrying system in the form of a belt, so that it can easily be carried on the body 40 of the user in any work environment. The blower filter device 20 has a fan housing 21, in which a fan impeller and at least one filter are arranged. Furthermore, the blower filter device 20 has a battery 15, which is used to operate the blower filter device 20.

Figure 2:
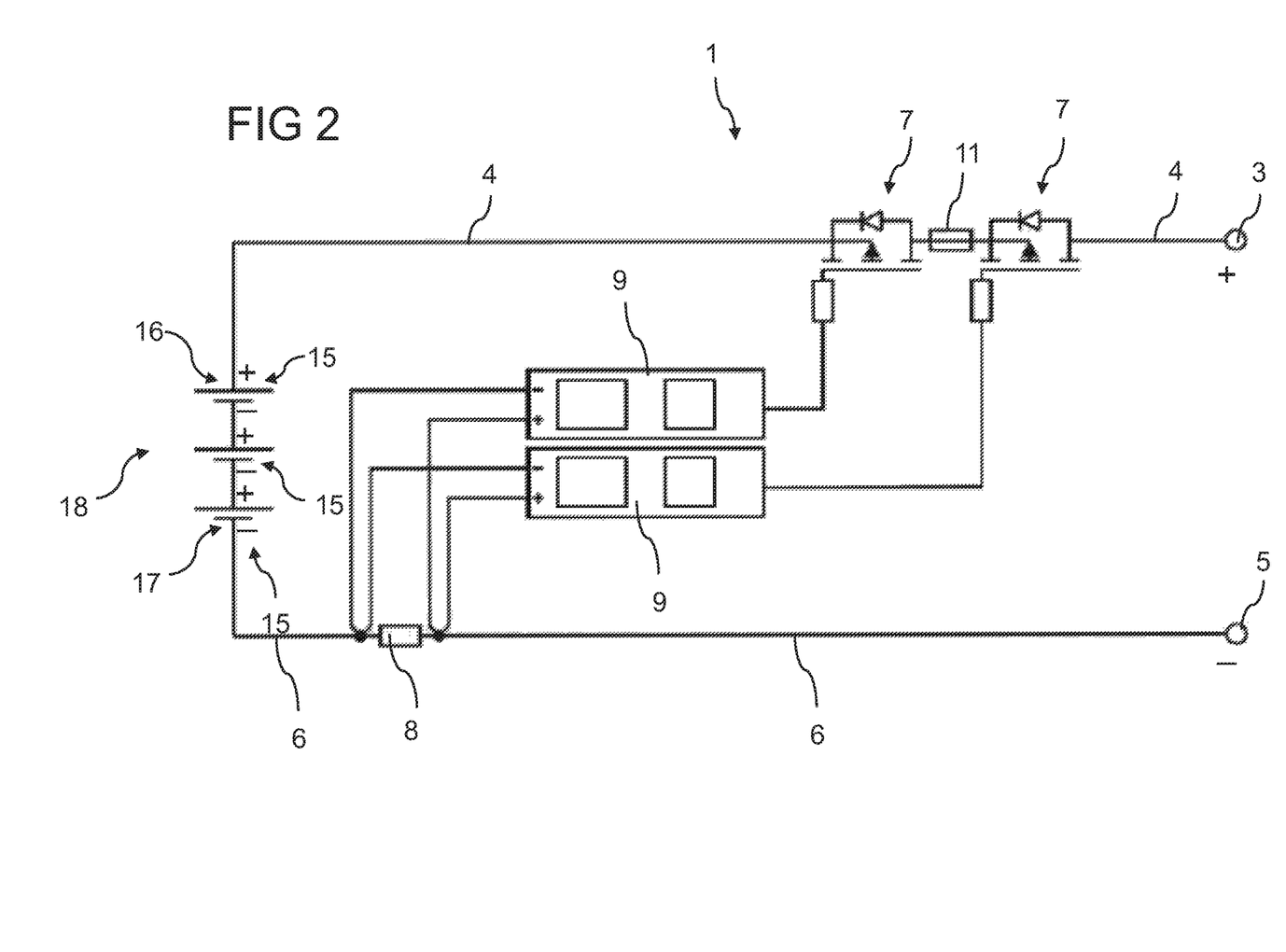
FIG. 2 is a schematic view showing an electronic circuit of a blower filter device of a blower filter system, which is configured to charge a battery pack of the blower filter device.

FIG. 2 schematically shows an electronic circuit 1 of a blower filter device 20 of a blower filter system 30, which is configured to charge a battery pack 18 of the blower filter device 20. The electronic circuit 1 is connected to the positive pole 16 and the negative pole 17 of the battery pack 18, respectively. The battery pack 18 has three batteries 15 or cells, which are connected in series.

The electronic circuit 1 has a first charging terminal 3, which is connected to a positive pole 16 of the battery pack 18 via a first electric line 4, and a second charging terminal 5, which is connected to a negative pole 17 of the battery pack 18 via a second electric line 6. Two parallel circuits 7, each having a resistor element branch comprising a diode (or alternatively an electric resistor having a resistance of at least 1 kOhm) and a circuit component branch comprising a MOSFET as the circuit component, are arranged in a series-connected arrangement in the first line 4. A measuring device 8 is arranged in the second line 6. An electronic control units 9, which are each configured to detect a voltage drop across the measuring device 8, are arranged in an electrically connecting manner between each of the two parallel circuits 7 and the measuring device 8. In particular, the electronic control units 9 can recognize the particular current direction is present by analyzing the voltage drop across the measuring device 8. The parallel circuits 7 are designed such that the parallel circuits 7 block the first electric line 4 in the absence of a charging current on the charging terminals 3, 5. The electronic control units 9 are designed such that when a negative voltage difference is detected across the measuring device 8 based on the presence of a charging current on the charging terminals 3, 5, they switch the parallel circuits 7 such that a charging current will flow through the electric lines 4, 6 and hence the battery pack 18.

This means that the battery pack 18 is charged via the charging terminals 3, 5 of the charging circuit 2 of the electronic circuit 1. The charging current is sent over the preferably redundant parallel circuits 7, especially the circuit components having the same design, especially the MOSFETs. If no external electric power source or charger is connected, the circuit components of the parallel circuits 7 block and switch the charging terminals 3, 5 to a high resistance or open and thus isolate the parallel circuits 7. If a charger is connected, the charging current flows through the parallel circuits 7, especially over the intrinsic diodes of the MOSFETs, in the first moment. This results in a voltage drop across the measuring device 8, which is analyzed by the electronic control units 9. The charging of the battery pack 18 is detected now in case of a negative voltage difference and the parallel circuits 7 and the MOSFETs and switched through. Only a minimal power loss is then generated on the parallel circuits 7. If the MOSFETs have $R_{DS(ON)}$ values of a few mOhms, for example, 10 mOhms, a power loss of only 250 mW, which does not cause any damage to the battery pack 18, is obtained at a charging current of 5 A. To prevent the batteries 15 or the cells of the battery pack 18 from being able to explode due to the introduction of an excessively large quantity of heat in case of error, the parallel circuits 7, especially the MOSFETs, are protected by a temperature fuse 11, which is thermally coupled with these and opens the circuit in case of an excessive temperature rise. The thermally coupled temperature fuse 11 is arranged in the first electric line 4 between the two parallel circuits 7. If the parallel circuits 7 are of an identical design, the margin can be kept low.

Figure 3:
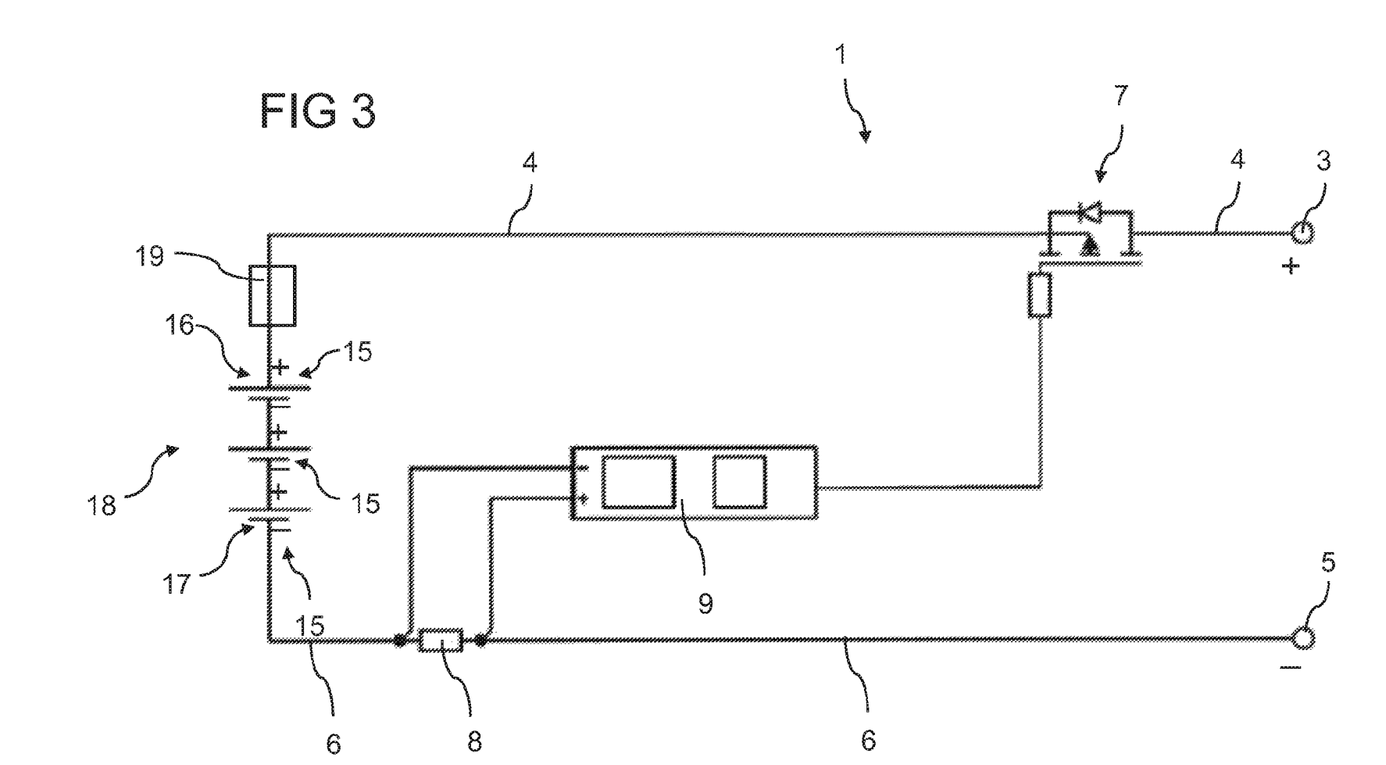
FIG. 3 is a schematic view showing another electronic circuit of a blower filter device of a blower filter system, which is configured to charge a battery pack of the blower filter device.

FIG. 3 schematically shows another electronic circuit 1 of a blower filter device 20 of a blower filter system 30, which system is configured for charging a battery pack 18 of the blower filter device 20. Unlike the electronic circuit 1 according to FIG. 2, the electronic circuit 1 according to FIG. 3 has only one parallel circuit 7 comprising a resistor element, especially a diode or an electric resistor with a resistance of at least 1 MOhm, and a circuit component. Only one electronic control unit 9 is correspondingly also arranged between the measuring device 8 and the parallel circuit 7. The electronic circuit 1 according to FIG. 3 otherwise functions in the same way as the electronic circuit 1 according to FIG. 2. Furthermore, the battery pack 18 may have a protective circuit 19. The protective circuit 19 preferably offers protection against overvoltage, excess current, temperature rise and insufficient temperature, deep discharge and inequality of the state of charge of the cells connected in series and may represent a measure for ensuring equality.

While specific embodiments of the invention have been shown and described in detail to illustrate the application of the principles of the invention, it will be understood that the invention may be embodied otherwise without departing from such principles.

The invention claimed is:

1. An electronic circuit for charging a battery of a blower filter device, which blower filter device can be supplied with power from an external electric power source, the electronic circuit comprising:
 a first charging terminal connected to a positive pole of the battery via a first electric line, and a second charging terminal, which can be connected to a negative pole of the battery via a second electric line;
 a plurality of parallel circuits arranged in one of the first line and the second line, the plurality of parallel circuits being connected in series, each of the parallel circuits comprising a resistor element comprising a diode and a switching component, wherein at least part of a corresponding charging current flows through each diode in the conducting direction during the charging of the battery;
 a measuring device configured to measure a charging current through one of the first line and the second line or a voltage between the charging terminals;
 at least one electronic control unit, configured to receive the measured signal of the measuring device and to monitor the flow of current through the lines between the circuit component and the measuring device, wherein:
 the electronic control unit is configured to switch the switch component to high resistance or open the circuit thereof in the absence of a charging current; and
 the electronic control unit is configured to switch the switch component to low resistance or close the circuit thereof in the presence of a charging current.

2. An electronic circuit in accordance with claim 1, wherein the circuit component is a MOSFET.

3. An electronic circuit in accordance with claim 1, wherein a thermally coupled temperature fuse is connected in the first line or in the second line between two circuit components.

4. An electronic circuit in accordance with claim 1, wherein a thermally coupled temperature fuse is connected in the first line or in the second line between at least the diode associated with one of the parallel circuits and at least the diode associated with another one of the parallel circuits.

5. An electronic circuit in accordance with claim 1, wherein a thermally coupled temperature fuse is connected in the first line or in the second line between at least the switching component associated with one of the parallel circuits and the switching component associated with at least another one of the parallel circuits.

6. A battery of a blower filter device, which can be supplied with a charging voltage from an external electric power source, the battery comprising:
 an electronic circuit for charging the battery, wherein the electronic circuit comprises:
 a first charging terminal connected to a battery positive pole via a first electric line and a second charging terminal connected to a battery negative pole via a second electric line;
 a plurality of parallel circuits arranged in one of the first line and the second line, the plurality of parallel circuits being connected in series, each of the parallel circuits comprising a resistor element comprising a diode and a switch component, wherein at least part of a corresponding charging current flows through each diode in the conducting direction during the charging of the battery;
 a measuring device configured to measure a charging current through one of the first line and the second line or measure a voltage between the charging terminals;
 at least one electronic control unit configured to receive the measured signal of the measuring device and to monitor the flow of current through the lines between the circuit component and the measuring device, wherein:
 the electronic control unit is configured to switch the switch component to high resistance or to open the circuit thereof in the absence of a charging current; and
 the electronic control unit is configured to switch the switch component to low resistance or close the circuit thereof in the presence of a charging current.

7. A battery in accordance with claim 6, wherein the battery is a battery pack with a plurality of batteries connected in series.

8. A battery in accordance with claim 6, further comprising a protective circuit.

9. A battery in accordance with claim 6, wherein the circuit component is a MOSFET.

10. A battery in accordance with claim 6, wherein a thermally coupled temperature fuse is connected in the first line or in the second line between two circuit components.

11. A battery in accordance with claim 6, wherein a thermally coupled temperature fuse is connected in the first line or in the second line between at least the diode associated with one of the parallel circuits and at least the diode associated with another one of the parallel circuits.

12. A blower filter device for a blower filter system, the blower filter device comprising:
 a battery for the supply of electric power of the blower filter device, the battery comprising:
 an electronic circuit for charging the battery, wherein the electronic circuit comprises:
 a first charging terminal connected to a battery positive pole via a first electric line and a second charging terminal connected to a battery negative pole via a second electric line;
 a plurality of parallel circuits arranged in one of the first line and the second line, the plurality of parallel circuits being connected in series, each of the parallel circuits comprising a resistor element comprising a diode and a switch component, wherein at least part of a corresponding charging current flows through each diode in the conducting direction during the charging of the battery;
 a measuring device configured to measure a charging current through one of the first line and the second line or measure a voltage between the charging terminals;
 at least one electronic control unit configured to receive the measured signal of the measuring device and to monitor the flow of current through the lines between the circuit component and the measuring device, wherein:
 the electronic control unit is configured to switch the switch component to high resistance or to open the circuit thereof in the absence of a charging current; and
 the electronic control unit is configured to switch the switch component to low resistance or close the circuit thereof in the presence of a charging current.

13. A blower filter device in accordance with claim 12, wherein the electronic circuit is arranged in the blower filter device.

14. A blower filter device in accordance with claim 12, wherein the circuit component is a MOSFET.

15. A blower filter device in accordance with claim 12, wherein a thermally coupled temperature fuse is connected in the first line or in the second line between two circuit components.

16. A blower filter device in accordance with claim 12, wherein a thermally coupled temperature fuse is connected in the first line or in the second line between at least the diode associated with one of the parallel circuits and at least the diode associated with another one of the parallel circuits.

17. A method for charging a battery of a blower filter device by means of an electronic circuit, the method comprising the steps of:

connecting a battery, for the supply of electric power of the blower filter device, to an electronic circuit for charging the battery, wherein the electronic circuit comprises:

a first charging terminal connected to a battery positive pole via a first electric line and a second charging terminal connected to a battery negative pole via a second electric line;

a plurality of parallel circuits arranged in one of the first line and the second line, the plurality of parallel circuits being connected in series, each of the parallel circuits comprising a resistor element comprising a diode and a switch component, wherein at least part of a corresponding charging current flows through each diode in the conducting direction during the charging of the battery;

a measuring device configured to measure a charging current through one of the first line and the second line or measure a voltage between the charging terminals;

at least one electronic control unit configured to receive the measured signal of the measuring device and to monitor the flow of current through the lines between the switch component and the measuring device, wherein:

the electronic control unit is configured to switch the switch component to high resistance or to open the circuit thereof in the absence of a charging current; and the electronic control unit is configured to switch the switch component to low resistance or close the circuit thereof in the presence of a charging current;

switching the switch component to high resistance or opening the circuit in the absence of a charging current; and switching the switch component to low resistance or closing the circuit in the presence of a charging current.

18. A method filter device in accordance with claim 17, wherein the circuit component is a MOSFET.

19. A method filter device in accordance with claim 17, wherein a thermally coupled temperature fuse is connected in the first line or in the second line between two circuit components.

20. A method in accordance with claim 17, wherein a thermally coupled temperature fuse is connected in the first line or in the second line between at least the diode associated with one of the parallel circuits and at least the diode associated with another one of the parallel circuits.

\* \* \* \* \*